US012511217B2

United States Patent
To et al.

(10) Patent No.: US 12,511,217 B2
(45) Date of Patent: Dec. 30, 2025

(54) PROCESSOR CORE IDLE TIME DETERMINATION FOR POWER AND PERFORMANCE MANAGEMENT

(71) Applicant: Microsoft Technology Licensing, LLC, Redmond, WA (US)

(72) Inventors: Khoa A. To, Redmond, WA (US); Omar Cardona, Bellevue, WA (US); Dmitry Malloy, Redmond, WA (US); Narcisa Ana Maria Vasile, Redmond, WA (US); Robert Tyler Retzlaff, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 765 days.

(21) Appl. No.: 17/810,154

(22) Filed: Jun. 30, 2022

(65) Prior Publication Data
US 2024/0004772 A1  Jan. 4, 2024

(51) Int. Cl.
*G06F 11/34* (2006.01)
*G06F 11/30* (2006.01)

(52) U.S. Cl.
CPC ...... *G06F 11/3419* (2013.01); *G06F 11/3024* (2013.01)

(58) Field of Classification Search
CPC .................. G06F 11/3419; G06F 11/3024
See application file for complete search history.

(56) References Cited

U.S. PATENT DOCUMENTS

| | | | | |
|---|---|---|---|---|
| 7,617,488 B2* | 11/2009 | Srinivasan | .......... | G06F 11/3423 717/130 |
| 7,814,485 B2* | 10/2010 | Morgan | ................ | G06F 1/3228 713/323 |
| 8,141,083 B2* | 3/2012 | Olszewski | ............ | G06F 9/5083 718/100 |
| 2007/0288728 A1* | 12/2007 | Tene | .................... | G06F 11/3409 712/227 |
| 2008/0271043 A1* | 10/2008 | Kim | ...................... | G06F 9/5027 718/108 |
| 2010/0125849 A1* | 5/2010 | Oswald | ................. | G06F 9/4881 712/205 |
| 2010/0287319 A1* | 11/2010 | Hill | ..................... | G06F 11/3089 710/220 |
| 2012/0137295 A1* | 5/2012 | Soetemans | .............. | G06F 9/524 718/100 |

(Continued)

*Primary Examiner* — Benjamin C Wu

(57) ABSTRACT

Systems and methods for determining and reporting actual utilization of a core of a central processing unit (CPU) of a host. Prior to implementation of aspects of the present disclosure, running a poll querying endpoints of a process for work appears to the host's operating system as busy work (e.g., taking full use of the core for the poll duration). However, only a percentage of the duration of the poll is used to process a task of the process, where the remaining duration of the poll is spent querying the endpoints (idle time) and the core is not performing a task. Accordingly, a core utilization reporting system and method automatically detects the processing time of the tasks of a process, determines actual CPU utilization of the core based on a percentage of the time the core is busy polling (doing effectively no work) versus doing actual work (processing a task).

20 Claims, 10 Drawing Sheets

(56) References Cited

U.S. PATENT DOCUMENTS

| | | | | |
|---|---|---|---|---|
| 2014/0359634 | A1* | 12/2014 | Arao | G06F 9/5011 |
| | | | | 718/104 |
| 2015/0277923 | A1* | 10/2015 | Bradbury | G06F 9/30076 |
| | | | | 712/215 |
| 2020/0142802 | A1* | 5/2020 | Norris | G06F 9/505 |
| 2023/0094430 | A1* | 3/2023 | Gates | G06F 9/5033 |
| | | | | 718/104 |
| 2024/0004772 | A1* | 1/2024 | To | G06F 11/3419 |

* cited by examiner

MOBILE COMPUTING DEVICE

PROCESSOR CORE IDLE TIME DETERMINATION FOR POWER AND PERFORMANCE MANAGEMENT

BACKGROUND

Remote or "cloud" computing typically utilizes a collection of remote servers in datacenters to host computing, data storage, electronic communications, or other cloud services. The hosts can be interconnected by computer networks to form one or more computing clusters. During operation, multiple remote hosts or computing clusters can cooperate to provide a distributed computing environment that facilitates execution of user applications to provide cloud services. A host typically includes a main central processing unit (CPU) with multiple cores to execute instructions independently, cooperatively, or in other suitable manners. In some examples, a core is configured to run a particular process, where the process includes one or more tasks that run on one or more endpoints configured on the core.

Users or server managers often monitor CPU utilization of the cores. For instance, a CPU utilization rate indicates an amount of time used by a CPU for processing instructions of a computer process. CPU utilization of a core is monitored to correctly estimate system performance and manage resource sizing, compute capacity planning, job scheduling, etc. An ability to accurately measure CPU utilization of a core enables its performance to be dynamically controlled (e.g., optimized) properly.

It is with respect to these and other considerations that examples have been made. In addition, although relatively specific problems have been discussed, it should be understood that the examples should not be limited to solving the specific problems identified in the background.

SUMMARY

Examples described in this disclosure relate to systems and methods for determining and reporting actual CPU utilization of a core. Examples of the present disclosure automatically detect processing times of tasks of a process during a poll, determines actual CPU utilization of the core based on a percentage of the time the core is busy polling (doing effectively no work) versus doing actual work (processing a task).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example by the accompanying figures, in which like references indicate similar elements. Elements in the figures are illustrated for simplicity and clarity and have not necessarily been drawn to scale.

DETAILED DESCRIPTION

Examples described in this disclosure relate to systems and methods for determining and reporting actual utilization of a core of a CPU. In prior systems, in some examples, a host's operating system perceives a process as taking full use of a core for a certain amount of time; however, this may not be the case. For example, the core can appear as doing work when it is busy polling. To address such problems with conventional virtual computing systems, the present disclosure provides a core utilization reporting system and method implemented in an example host for detecting and reporting the actual utilization of a core (e.g., the percentage of the time the core is busy polling (doing nothing) versus doing actual work). For example, the core utilization reporting system and method enables determining (based on a given core and its performance) the amount of core utilization, which allows determining how many cores are needed to meet a certain bandwidth.

Figure 1:
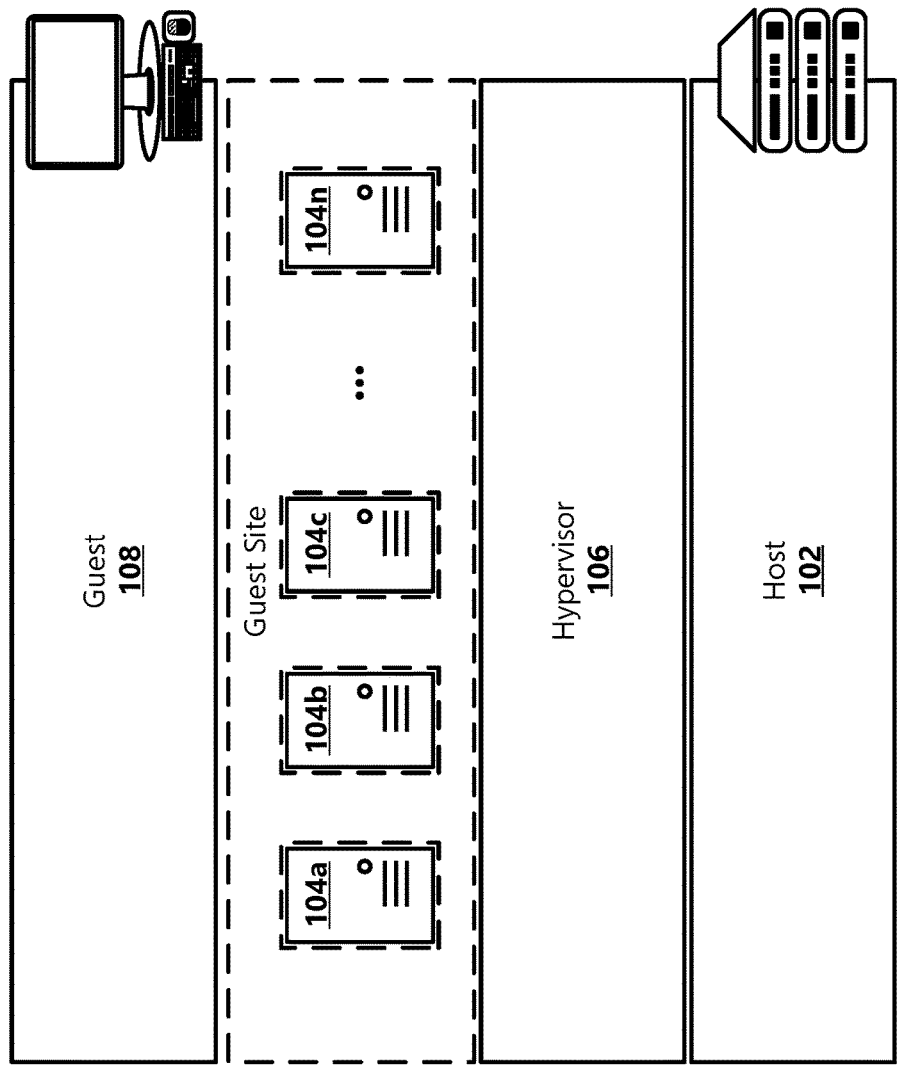
FIG. 1 is a block diagram of a system for determining and reporting actual CPU utilization of a core according to an example.

FIG. 1 is a block diagram of a computing system 100 that determines and reports actual CPU utilization according to an example. As used herein, the term "computing system" generally refers to an interconnected computer network having a plurality of network devices that interconnect a plurality of hosts 102 (e.g., servers) to one another, to guests 108, and/or to external networks (e.g., the Internet). The term "network device" generally refers to a physical network device, examples of which include routers, switches, hubs, bridges, load balancers, security gateways, or firewalls. The host 102 generally refers to a computing device configured to implement, for instance, one or more endpoints 104a-n (collectively, endpoints 104), such as virtual machines or other suitable virtualized components. For example, the host 102 may include a hypervisor 106 configured to support one or more endpoints 104. In some examples, the host 102 can be organized into a rack, action zone, group, set, or other suitable division. The host 102 can be configured to provide computing, storage, and/or other suitable cloud computing service to one or more guests 108.

The guest 108 generally refers to a computing device configured to access services provided by the host 102. For example, the host 102 can maintain one or more endpoints 104 (e.g., virtual machines) upon requests from the guest 108. The guest 108 can use the endpoints 104 to perform computation, communication, and/or other suitable tasks. In some examples, the host 102 can provide endpoints 104 for a plurality of guests 108. In some examples, the hypervisor 106 generates, monitors, terminates, and/or otherwise manages one or more endpoints 104 organized into a guest site. In some examples, the hypervisor 106 manages multiple guest sites. Each endpoint 104 can execute a corresponding (guest) operating system, middleware, and/or suitable application processes. For instance, the executed application processes can each correspond to one or more cloud computing services or other suitable types of computing services.

A virtual network can include one or more virtual endpoints referred to as "guest sites" individually used by a guest 108 to access the virtual network and associated computing, storage, or other suitable resources. A guest site can have one or more endpoints 104, for example, virtual machines. The virtual networks can interconnect multiple endpoints 104 on different hosts 102. Virtual network devices can be connected to one another by virtual links individually corresponding to one or more network routes along one or more physical network devices in the networks.

Figure 2A:
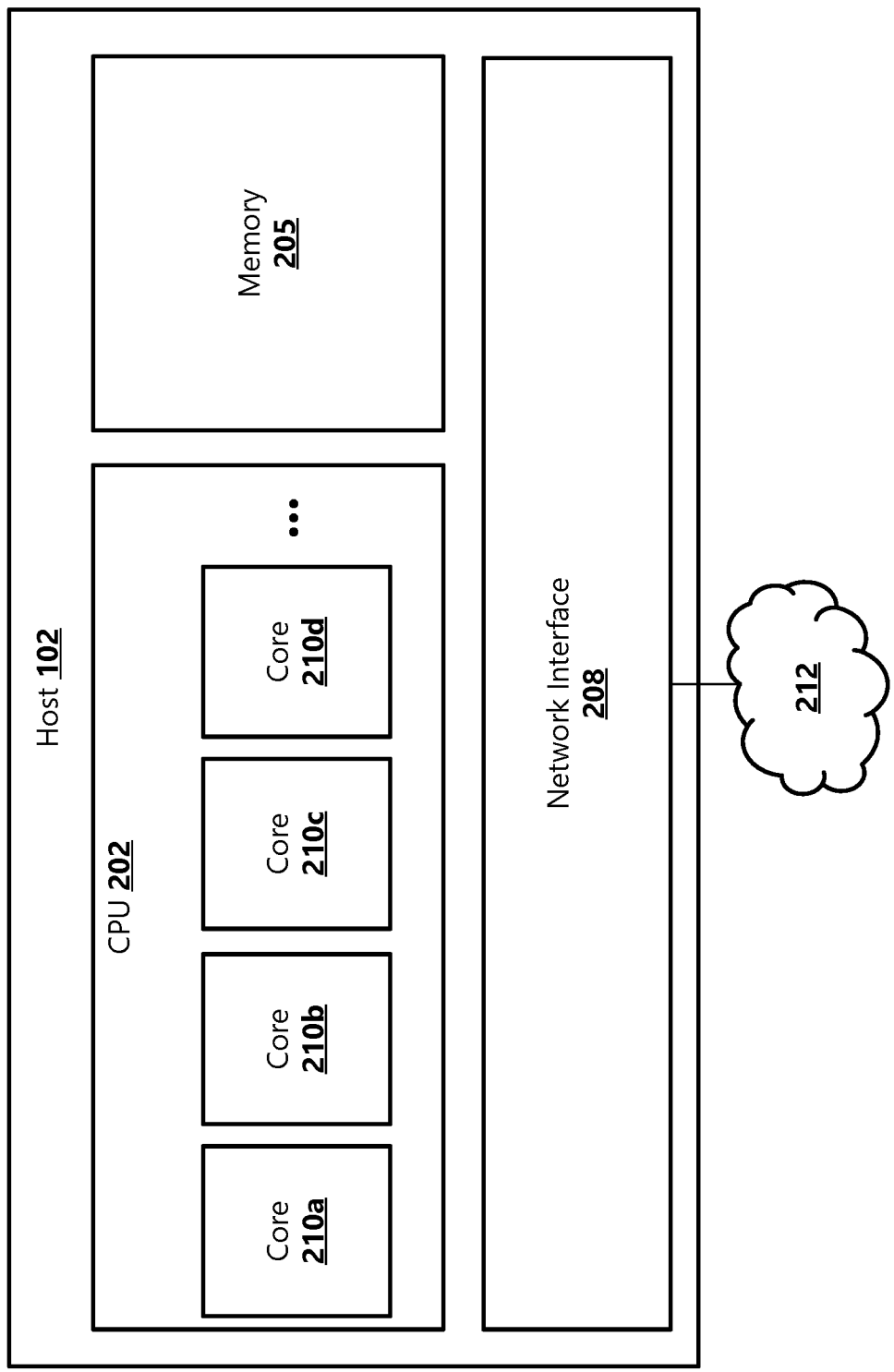
FIG. 2A is a schematic diagram of a host suitable for implementing a core utilization reporting system according to an example.

With reference now to FIG. 2A, a schematic diagram is provided illustrating an example host 102 suitable for implementing examples of the present disclosure according to an example. In FIG. 2A, the host 102 includes central processing unit (CPU) 202, a memory 205, and a network interface 208 operatively coupled to one another. The CPU 202 includes an electrical circuit comprising discrete electronic elements, packaged or integrated electronic chips containing logic gates, a circuit utilizing a microprocessor, a single chip containing electronic elements or microprocessors, or other suitable logic devices. The memory 205 includes volatile and/or non-volatile media and/or other types of computer-readable storage media configured to store data received from, as well as instructions for, the CPU 202 (e.g., instructions for performing the methods discussed below with reference to FIG. 3 and FIG. 5). The network interface 208 includes a network interface controller (NIC), a connection converter, and/or other suitable types of input/output devices configured to accept input from and provide output to serves and clients on a network 212 (e.g., external network, internal network, private network).

As shown, the CPU 202 includes one or more cores 210a-d (collectively, cores 210) configured to execute instructions independently or in other suitable manners. In some examples, the CPU 202 includes four cores 210 as shown. In other examples, the CPU 202 includes eight cores 210. In other examples, the CPU 202 includes sixteen cores 210. In other examples, the CPU 202 includes another suitable number of cores 210. The cores 210 can individually include one or more arithmetic logic units, floating-point units, L1 and L2 cache, and/or other suitable components. In some examples, the CPU 202 further includes one or more peripheral components that facilitate operations of the cores 210, such as interconnect controllers, an L3 cache, a snoop agent pipeline, and or other suitable elements.

Figure 2B:
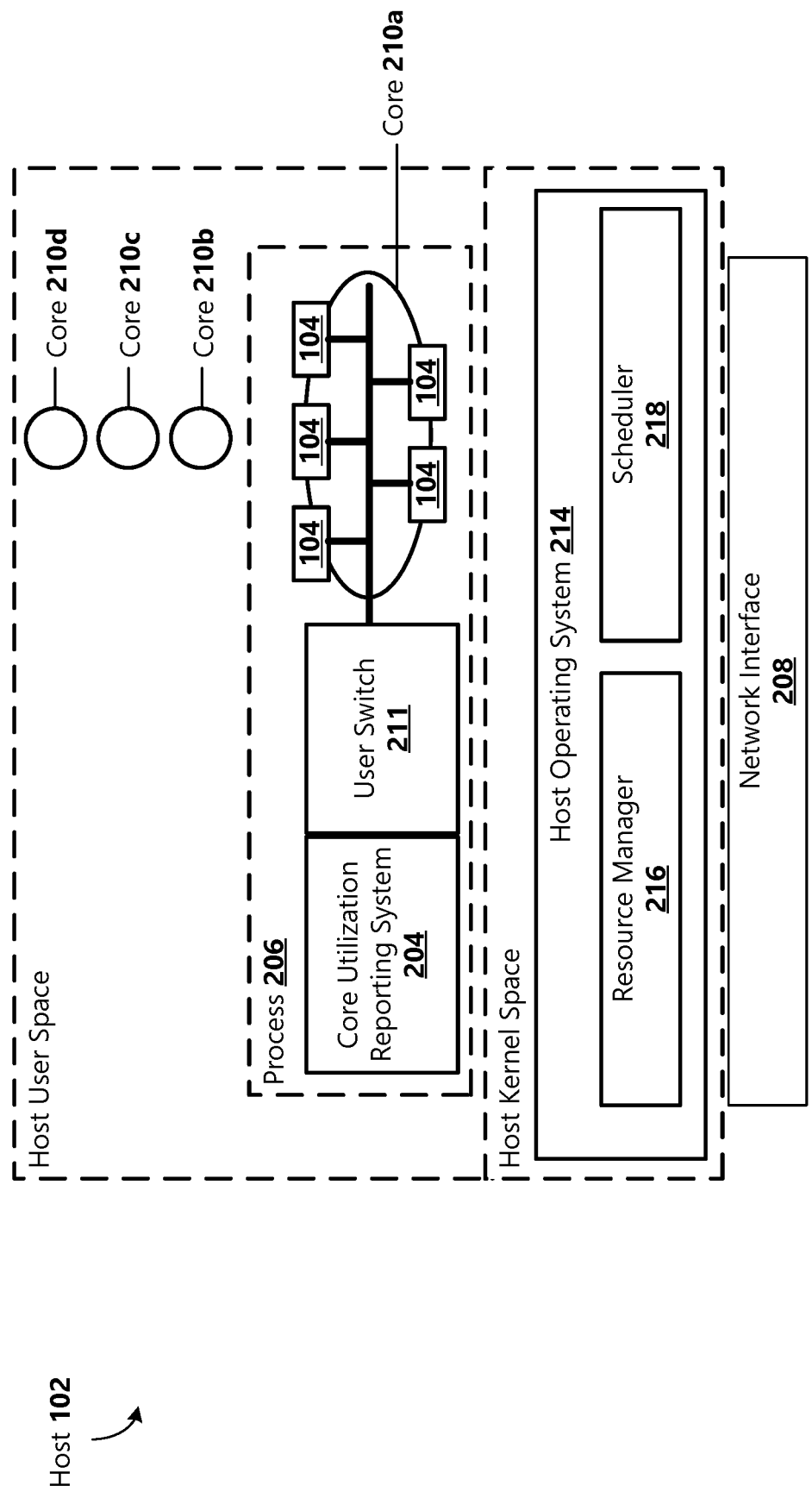
FIG. 2B is a schematic diagram illustrating a core utilization reporting system implemented in a host according to an example.

With reference now to FIG. 2B, a schematic diagram is provided illustrating a core utilization reporting system 204 implemented in an example host 102. For example, the core utilization reporting system 204 is illustrative of a software application, system, or module that operates on a computing device or across a plurality of computer devices. Any suitable computer device(s) may be used, including web servers, application servers, network appliances, dedicated computer hardware devices, virtual server devices, personal computers, a system-on-a-chip (SOC), or any combination of these and/or other computing devices known in the art. As will be described herein, the core utilization reporting system 204 operates to execute a number of computer readable instructions, data structures, or program modules to determine and report actual CPU utilization of a core 210 according to an example. For instance, actual CPU utilization is a metric of the sum of work (e.g., quantified in time) handled by a core 210 of the CPU 202. The core utilization reporting system 204 detects actual work time and idle time of the endpoints 104 in a core 210 for determining the actual CPU utilization.

As shown, an application process 206 uses a first core 210a of four cores 210a-d included in the host 102 to perform one or more tasks. In an example, the core utilization reporting system 204 is located in the host user space, such as included in or communicatively attached to a user switch 211 associated with the process 206. The user switch 211 allows endpoints 104 to communicate with other computers (e.g., access to a physical network to communicate with servers and clients on an external network 212; between endpoints 104, and between the endpoints 104 and the host operating system (OS) 214). For example, the process 206 includes one or more threads that run on one or more endpoints 104 and the user switch 211 of the first core 210a. In other example, the process 206 can use additional cores 210b-d, where an instance of the core utilization reporting system 204 is implemented on each of the additional cores 210a-d.

According to examples, in determining the actual CPU utilization, the core utilization reporting system 204 records a plurality of timestamps while polling the endpoints 104 in the process 206 for work in a sequence (e.g., a poll loop). For example, the plurality of timestamps define processing time related to processing time of one or more tasks of the process 206 and idle time related to idle time in the polling loop. Accordingly, the total processing time of the tasks of the process 206 is determined to be the actual CPU utilization of the core 210.

According to examples, the core utilization reporting system 204 further reports the determined actual CPU utilization to a receiving component, such as a resource manager 216 tracks and manages the resources of the host 102. In some examples, the resource manager 216 operates on the host OS 214. In other examples, the resource manager 216 is remotely located from the host 102. In some examples, the resource manager 216 actively makes various CPU power management and usage decisions and manages CPU 202 hardware (e.g., the cores 210) based on the decisions. Power management includes balancing power consumption and performance of the cores 210 and usage includes balancing the processing requirements of processes 206 and drivers. For example, the resource manager 216 can dynamically manage core power and usage as workloads change. In one example, a process 206 is transitioned to lower power cores 210. In another example, work is collapsed to fewer cores 210. In another example, work is expanded to cores 210 on a threshold. In another example, work is ceded to a scheduler 218. In another example, queue balancing is performed using actual CPU utilization metrics.

Figure 2C:
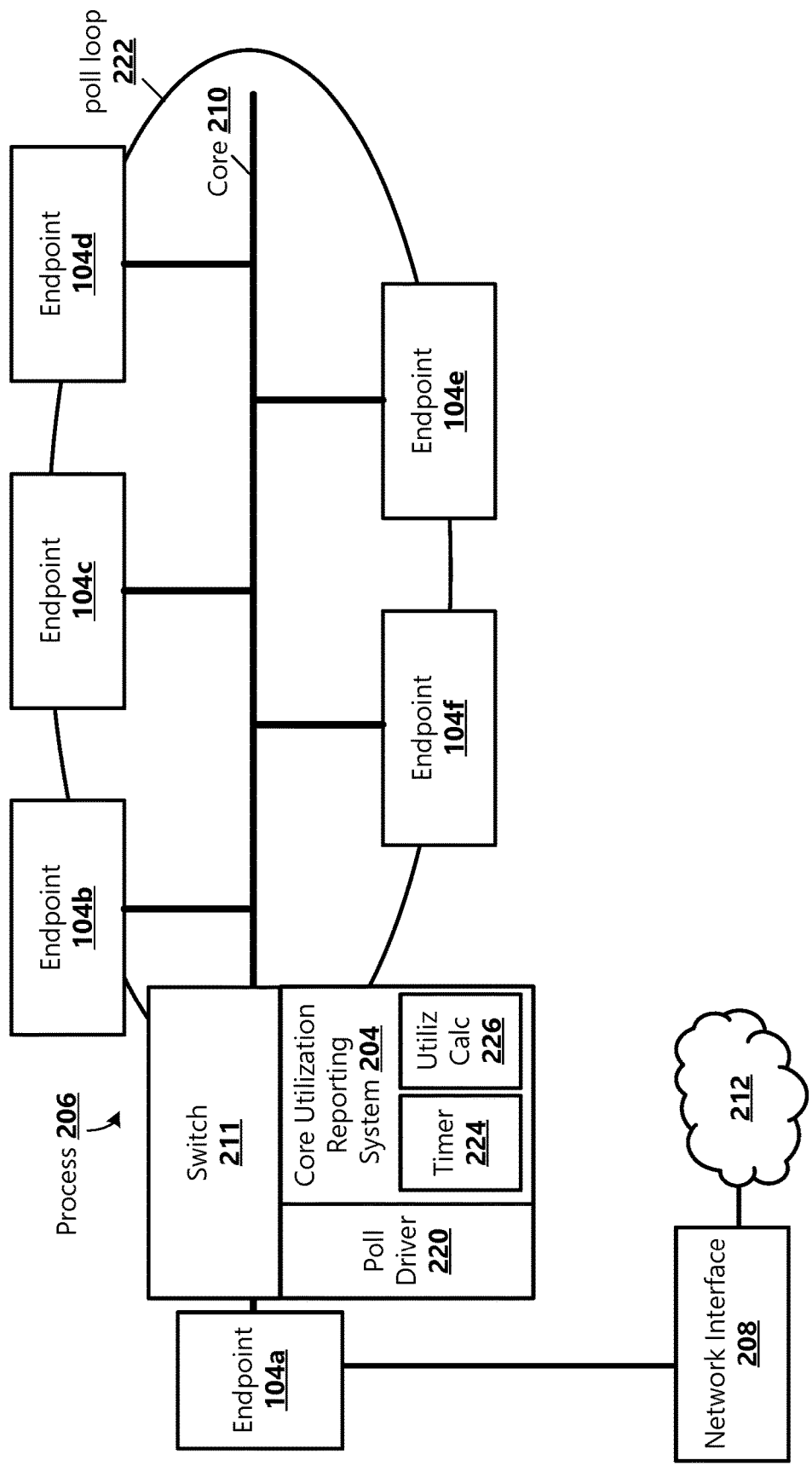
FIG. 2C is a block diagram illustrating a poll loop corresponding to a process implemented on a core for detecting actual CPU utilization of the core according to an example.

With reference now to FIG. 2C, a block diagram is provided illustrating a poll loop 222 corresponding to a process 206 implemented on a core 210 for detecting actual CPU utilization of the core 210 according to an example. In some examples, the process 206 uses a core 210 from the CPU 202 to poll each endpoint 104a-f for work. For example, a poll driver 220 in communication with the core utilization reporting system 204 initiates a poll to query the endpoints 104 on a poll loop 222 for work. For instance, the poll driver 220 receives, processes, and delivers packets of the application process 206. When an endpoint 104 responds that it has work (e.g., data to transmit), the data is received and processed through the user switch 211 and transmitted to other endpoints 104, as needed. The poll driver 220 continues to poll and transmit work traffic from additional endpoints 104, if any, until the poll loop 222 is complete. The poll driver 220 then initiates a next poll on the poll loop 222. According to examples, data is processed at a rate of millions and millions of packets per second. For instance, the poll runs at a rate of millions and millions per second.

As mentioned above, the process 206 uses a core 210 from the CPU 202 to query (e.g., poll) the endpoints 104 for work. Accordingly, prior to implementation of aspects of the present disclosure, running the poll appears to the host OS 214 as busy work. For instance, the host OS 214 may perceive the poll driver 220 taking full use of the CPU for the duration of the poll. However, this may not be the case on the actual core 210. Although the thread of the poll appears to the host OS 214 as using full usage (e.g., 100%) of the CPU of the core 210, in reality, only a percentage of the duration of the poll loop 222 is used to process work received from an endpoint 104. This time duration in which work is processed is herein referred to as processing time $T_P$.

Accordingly, core utilization reporting system 204 is provided to automatically detect the processing time $T_P$ of the tasks of the process 206 and report the actual CPU utilization of the core 210 (e.g., the percentage of the time the core is busy polling (doing effectively no work, herein referred to as idle time $T_I$) versus doing actual work (the processing time $T_P$)). For instance, when the core 210 is polling, the endpoints 104 are queried for incoming data. And when data/work is found, the data is processed and actual work is performed. Non-limiting example types of polling schemes include a Round-Robin Scheme, a Cyclic Shift Polling Scheme, and a First-In-First-Out Polling Scheme. In some examples, the core utilization reporting system 204 includes a utilization calculator 226 that calculates the processing time $T_P$ and the idle time $T_I$ of a poll. The processing time $T_P$ and the idle time $T_I$ are used to determine the actual CPU utilization rate. As can be appreciated, during the determined idle time $T_I$ of a core 210, other work could be performed on the core 210. That is, a determination can be made that the idle time $T_I$ is indicative that the core 210 has spare capacity and/or that the core 210 is being underutilized. Accordingly, work can be dynamically shifted or other actions can be performed based on input load to minimize the idle time $T_I$, and thus optimize the actual CPU utilization rate of the core 210.

Figure 3:
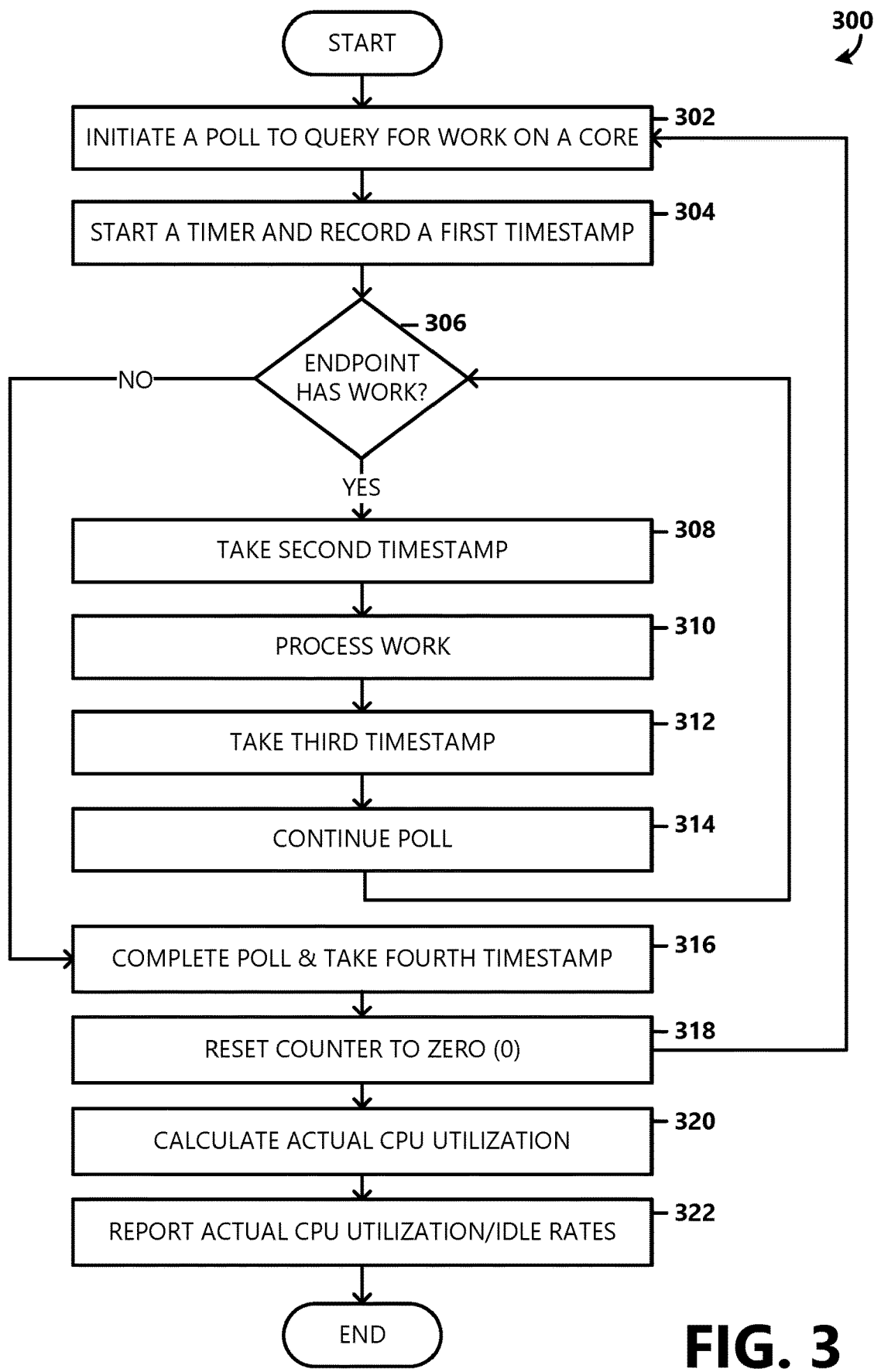
FIG. 3 is a flowchart depicting operations of an example method for determining and reporting actual CPU utilization of a core.

In some examples and as shown in FIG. 2C, the core utilization reporting system 204 includes a timer 224 for recording a plurality of timestamps associated with the poll. According to an example, the timer 224 records a start timestamp and an end timestamp at the start and end of the poll loop 222. According to another example, the timer 224 records a start timestamp and an end timestamp at the start and end of processing work from an endpoint 104. Accordingly, based on the timestamps, the utilization calculator 226 calculates a total poll loop time $T_L$ corresponding to the time duration to complete the poll loop 222, a total processing time $T_P$ corresponding to the total time duration to complete one or more tasks of the process 206 during the poll, and a total idle time $T_I$ corresponding to the time duration when the core 210 is not performing work associated with performing a task of the process 206. As can be appreciated, being able to properly control performance of a resource, such as a core 210, requires correct measurement of the utilization of the resource. According to an example, the core utilization reporting system 204 provides accurate measurement of the actual CPU utilization rate while running at fast poll intervals (e.g., millions of times per second). For instance, processing and idle time of the endpoints 104 can be observed at microsecond granularity, which enables actual CPU utilization at that fine time scale to be inferred, FIG. 3 is a flowchart depicting a method 300 for determining and reporting the actual CPU utilization of a core 210 according to an example. With reference now to FIG. 3, the method 300 starts when a process 206 uses a core 210 of a CPU 202 to perform one or more tasks. As an illustrative example and as shown in FIG. 2C, the process 206 includes six endpoints (e.g., a first endpoint 104a, a second endpoint 104b, a third endpoint 104c, a fourth endpoint 104d, a fifth endpoint 104e, and a sixth endpoint 104f). According to an example, the first endpoint 104a includes an uplink port and queues operatively connected to the network interface 208, and the second, third, fourth, fifth, and sixth endpoints 104b-104f are embodied as virtual machines that run threads of the process 206.

With reference again to FIG. 3, at operation 302, a poll is initiated on the core 210 for packets. For example, the endpoints 104a-f are included in a poll loop 222 and queried through the poll driver 220 for work.

At operation 304, when the poll is initiated, the timer 224 is started and a first timestamp is recorded. For instance, the first timestamp provides a start time of the polling loop (a poll loop start time $T_{LS}$), which can differ from the start time of performing work in the process 206 (a processing start time $T_{PS}$).

At decision operation 306, a determination is made as to whether an endpoint 104 has work. Continuing with the illustrative example above, consider that the second endpoint 104b (endpoint B), the fourth endpoint 104d (endpoint D), and the fifth endpoint 105e (endpoint E) respond to the poll with work. Thus, at decision operation 306, a first determination is made that the second endpoint 104b has work to send through the switch 211, and the method 300 proceeds to operation 308, where a second timestamp is recorded. For instance, the second timestamp provides a start time corresponding to performing work in association with the second endpoint 104b (i.e., a first processing start time $T_{PS-B}$).

At operation 310, the work is processed through the switch 211 and any other endpoints 104a, 104c-f associated with the work, if any. In some examples, data is sent through the switch 211 to the network interface 208. In some examples, data is received through the switch 211 and transmitted to one or more endpoints 104 to complete the work (task).

At operation 312, a third timestamp is recorded. For instance, the third timestamp provides an end time of performing the work in association with the endpoint (i.e., a first processing end time $T_{PE-B}$).

At operation 314, the poll continues and returns to decision operation 306, where a determination is made as to whether next endpoint 104 in the poll loop 222 has work. As mentioned above, in the illustrative example, the fourth endpoint 104d (endpoint D) and the fifth endpoint 105e (endpoint E) additionally indicate they have work. Thus, operations 308-314 repeat for recording a second processing start time $T_{PS-D}$ and a second processing end time $T_{PE-D}$, corresponding to processing endpoint D's work, and a third processing start time $T_{PS-E}$ and a third processing end time $T_{PE-E}$ corresponding to processing endpoint E's work.

When a determination is made at decision operation 306 that a next endpoint 104 in the poll loop 222 does not have work and the poll has reached its starting point, at operation 316, the poll is completed and a last timestamp is recorded in association with the end (completion) time of the poll. For instance, the last timestamp provides an end time of the polling loop (a loop end time $T_{LE}$).

At operation 318, the timer 224 is reset to zero. For example, the timer 224 is reset to record a next loop start time Tis in association with a next poll of the core 210.

At operation 320, the actual CPU utilization rate is calculated. For example, the delta time between each of the processing start times $T_{PS}$ and corresponding processing end times $T_{PE}$ are calculated and summed to represent a total time of processing or performing work by the core 210 (total processing time $T_P$). Additionally, the delta time between the poll loop start time $T_{LS}$ and poll loop end time $T_{LE}$ is calculated to represent a total poll loop time $T_L$. Further, a ratio of the total processing time $T_P$ to the total poll loop time $T_L$ is determined, which is calculated as the actual CPU utilization rate of the core 210.

In some examples, an actual CPU idle rate of the core 210 is determined by determining a ratio of the difference between the total processing time $T_P$ and the total poll loop time $T_L$ (e.g., $T_P-T_L$) and the total poll loop time $T_L$ (e.g., $(T_P-T_L)/T_L$).

At operation 322, the actual CPU utilization and/or idle rates are provided to one or more receivers. In one example, the receiver includes the resource manager 216, which uses the received metrics to dynamically manage core power and usage. For example, based on the actual CPU utilization rate of the core 210, a determination may be made to transition the process 206 to lower power cores 210, collapsed to fewer cores 210, expand to cores 210 on a threshold, cede work to a scheduler 218, perform queue balancing, or another core power or usage adjustment to improve utilization of the core 210. The method ends after operation 322.

Figure 4:
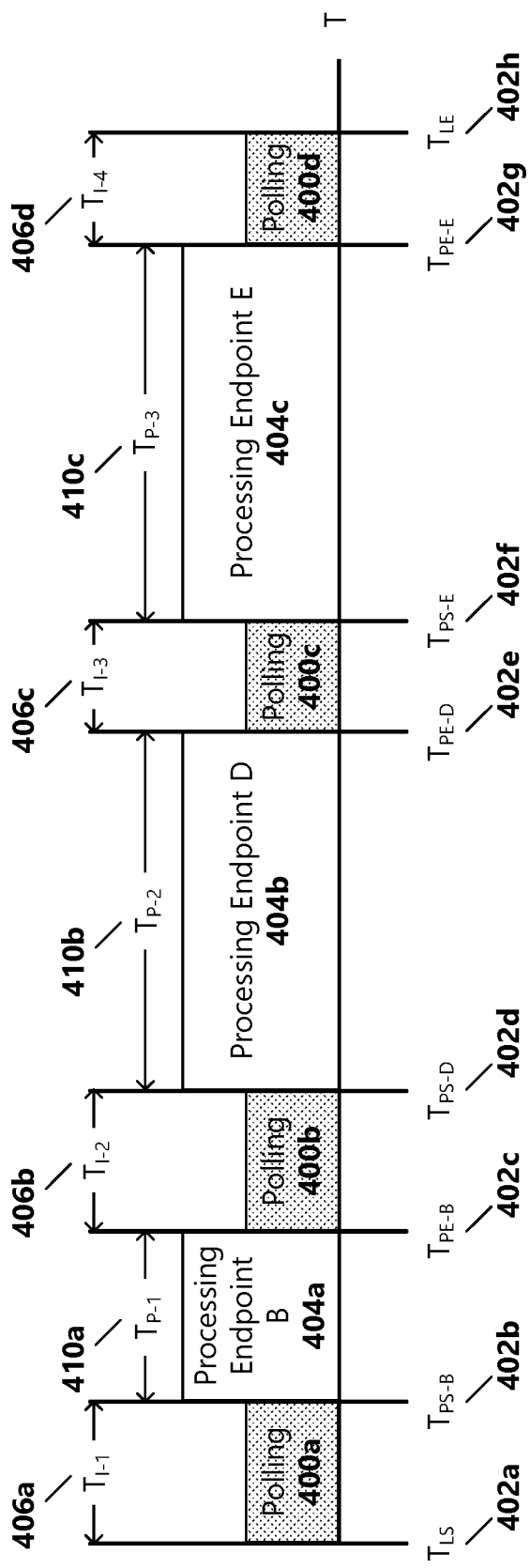
FIG. 4 is a block diagram illustrating CPU usage of a core according to an example.

With reference now to FIG. 4, a block diagram illustrating CPU usage corresponding to the illustrative example described above with respect to FIG. 2C and FIG. 3 is shown. In the diagram, time (T) flows from left to right. A first polling thread 400a is run on the core 210 for a first poll loop time $T_{L-1}$ 406a until a first processing thread 404a is hard-affinitized to the core 210. For example, a first timestamp 402a (e.g., poll loop start timestamp Tis) is recorded at the start of the poll loop 222 when the first polling thread 400a is initiated, and a second timestamp 402b (e.g., process start timestamp $T_{PS-B}$) is recorded when work (e.g., first processing thread 404a) is performed for the second endpoint 104b (endpoint B). Additionally, the first processing thread 404a is processed for a first processing time $T_{P-1}$ 410a until the task is complete. A third timestamp 402c (e.g., process end timestamp $T_{PE-B}$) is recorded when work (e.g., first processing thread 404a) is completed for the second endpoint 104b (endpoint B).

Continuing with the illustrative example, a second polling thread 400b is run on the core 210 for a second poll loop time $T_{L-2}$ 406b until a second processing thread 404b is hard-affinitized to the core 210. For example, a fourth timestamp 402d (e.g., process start timestamp $T_{PS-D}$) is recorded when work (e.g., second processing thread 404b) is performed for the fourth endpoint 104d (endpoint D). Additionally, the second processing thread 404b is processed for a second processing time $T_{P-2}$ 410b until the task is complete. A fifth timestamp 402e (e.g., process end timestamp $T_{PE-D}$) is recorded when work (e.g., second processing thread 404b) is completed for the fourth endpoint 104d (endpoint D).

In further continuance of the illustrative example, a third polling thread 400c is run on the core 210 for a third poll loop time $T_{L-3}$ 406c until a third processing thread 404c is hard-affinitized to the core 210. For example, a sixth timestamp 402f (e.g., process start timestamp $T_{PS-E}$) is recorded when work (e.g., third processing thread 404c) is performed for the fifth endpoint 104e (endpoint E). Additionally, the third processing thread 404c is processed for a third processing time $T_{P-3}$ 410c until the task is complete. A seventh timestamp 402g (e.g., process end timestamp $T_{PE-E}$) is recorded when work (e.g., third processing thread 404c) is completed for the fifth endpoint 104e (endpoint E).

Further, a fourth polling thread 400d is run on the core 210 for a fourth poll loop time $T_{L-4}$ 406d until the poll loop 222 is complete. For example, an eighth timestamp 402h (e.g., poll loop start timestamp $T_{LS}$) is recorded at the end of the poll loop 222. According to examples, the timestamps 402 are used to determine actual work time versus idle time of the core 210. As described above, the actual CPU utilization of the core 210 can be used for various CPU power management and usage decisions.

Figure 5:
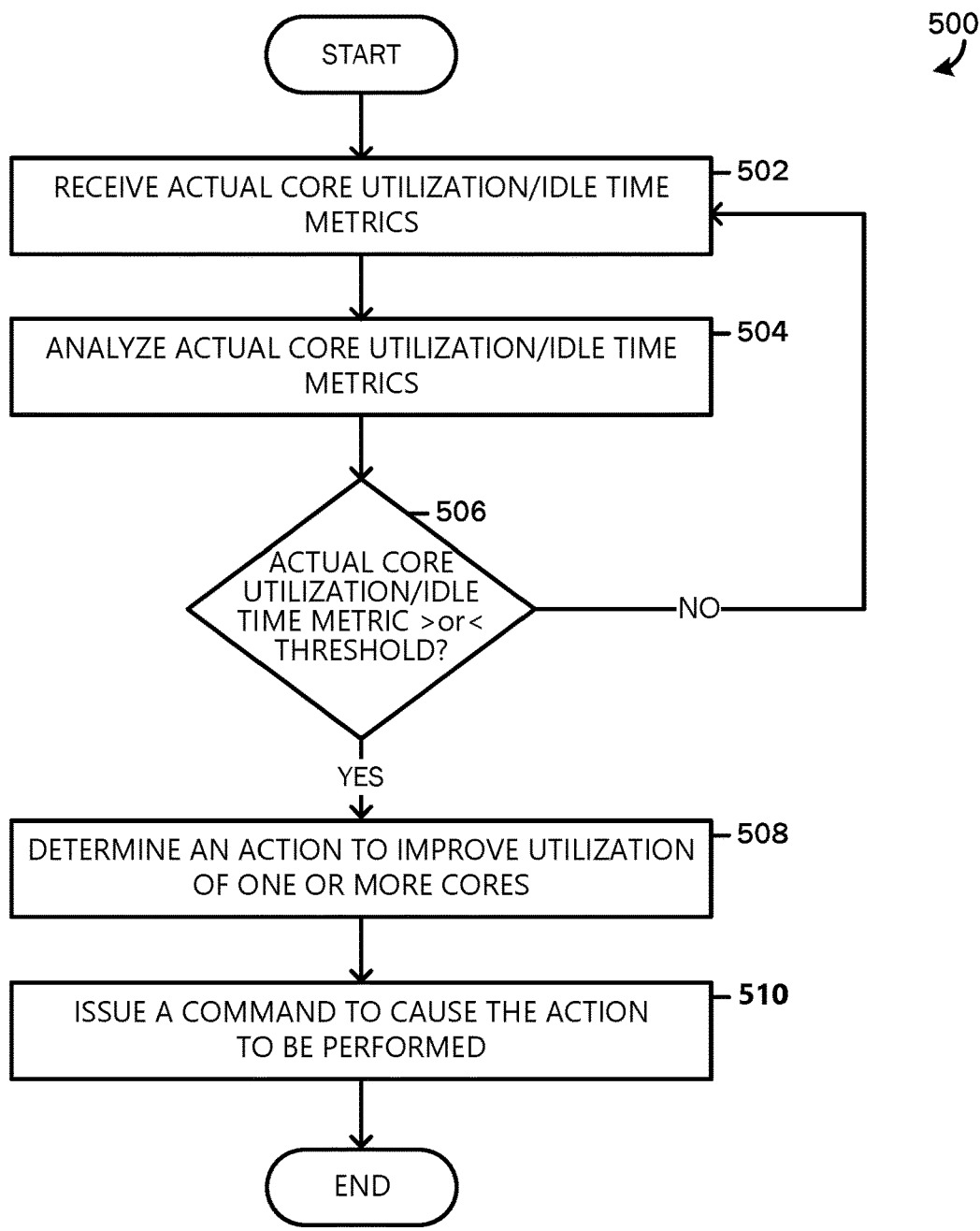
FIG. 5 is a flowchart depicting operations of an example method for using reported actual utilization of a core information for selecting an action to manage CPU utilization of the core.

FIG. 5 is a flowchart depicting a method 500 for making and implementing a CPU power management and usage decision according to an example. With reference now to FIG. 5, the method 500 starts at operation 502 when actual CPU utilization/idle time metrics are received from or more cores 210, such as when actual CPU utilization/idle time metrics are reported at operation 322 in the method 300 described above. According to an example, metrics associated with the actual CPU utilization of each core 210 configured on a host 102 is received.

At operation 504, the actual CPU utilization/idle time metrics are analyzed. For example, the metrics are evaluated against one or more CPU utilization thresholds (e.g., an upper threshold and/or a lower threshold) for determining (e.g., at decision operation 506) whether the actual CPU utilization/idle time metrics are within the CPU utilization thresholds. For instance, the actual CPU utilization/idle time metrics can be used to determine a number of cores that are needed to meet a certain bandwidth. For example, when the actual CPU utilization rate of a core 210 is above a CPU utilization threshold, the core 210 may exceed a CPU power budget, which can indicate the core 210 is being overutilized. As another example, when the actual CPU utilization rate of a core 210 is below a CPU utilization threshold and/or the actual idle time of the core 210 is above an idle time threshold, a determination can be made that the core 210 is underutilized.

Accordingly, when a determination is made at decision operation 506 that one or more CPU utilization and/or actual idle time metrics are outside a threshold, at operation 508, one or more decisions are made to cause the core's utilization of the CPU 102 to improve. For instance, an appropriate action is determined at operation 508, and the appropriate action is taken at operation 510. Example appropriate actions include issuing a command to cause one or more of: transitioning a process 206 to a lower power core 210, collapsing a process 206 to fewer cores 210, expanding a process 206 to cores 210 on a threshold, ceding work to the scheduler 218, performing queue balancing, or another core power or usage adjustment to improve utilization of the core 210. The method ends after operation 510.

Figure 6:
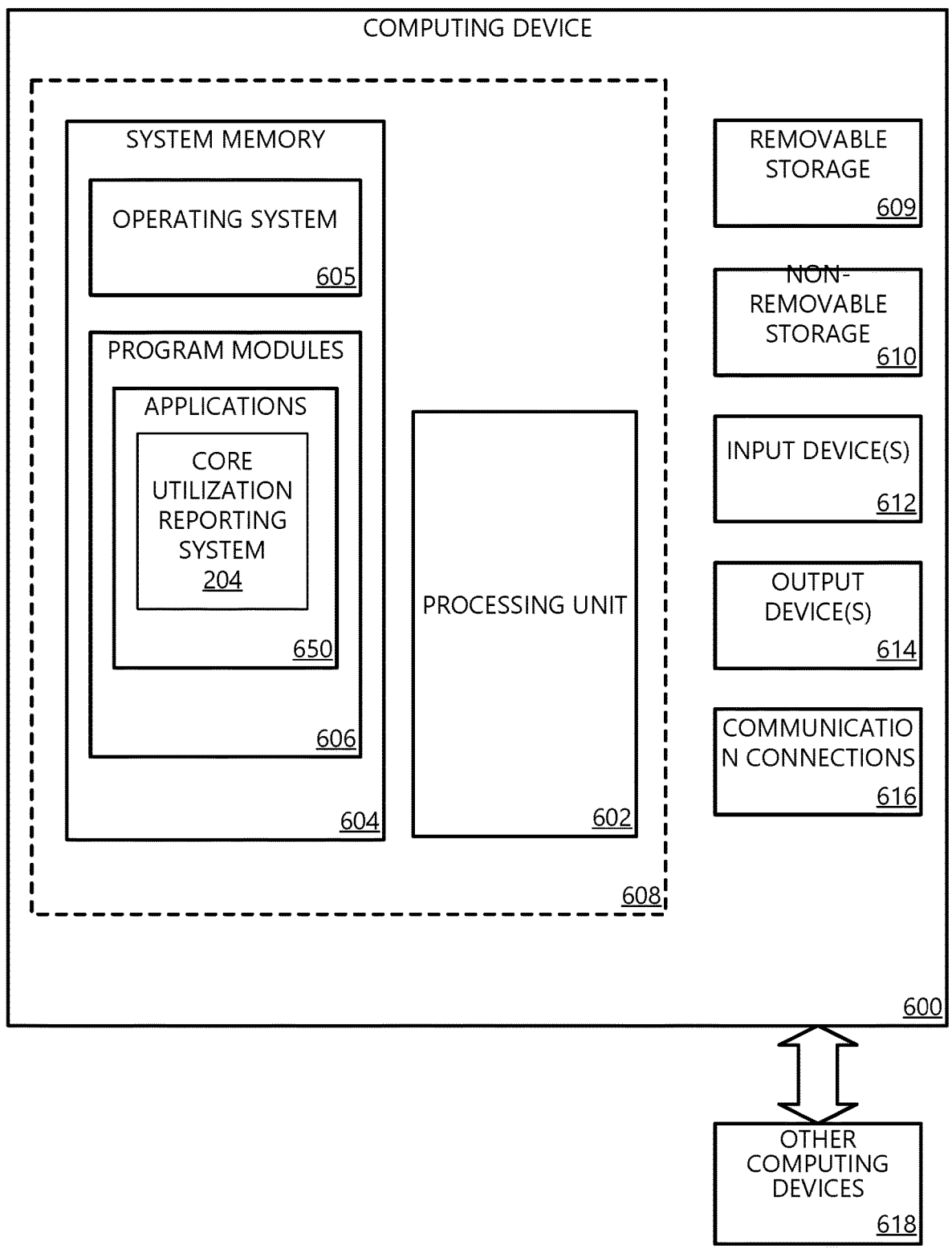
FIG. 6 is a block diagram illustrating example physical components of a computing device with which aspects of the disclosure may be practiced.
Figure 7A:
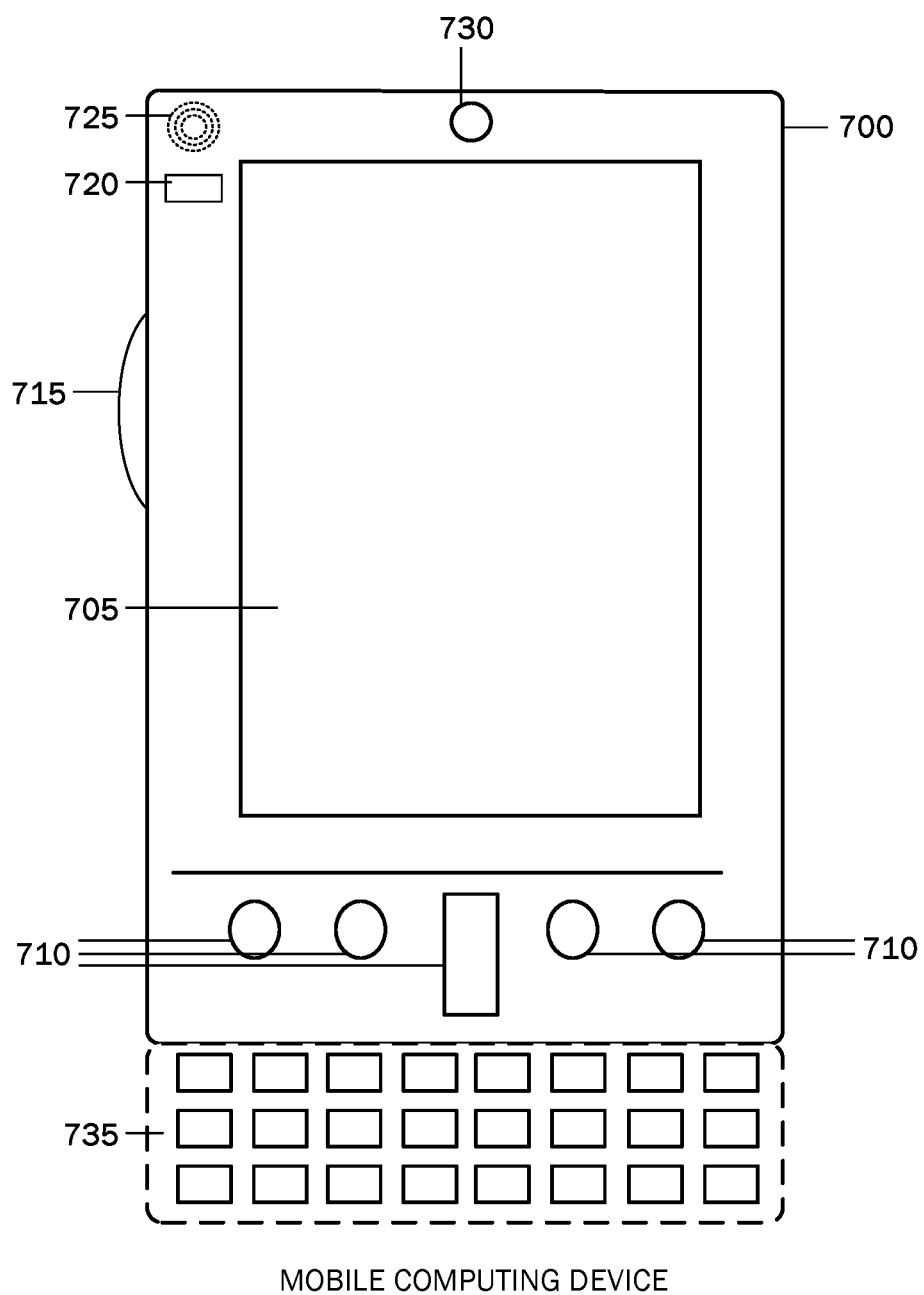
FIGS. 7A and 7B are block diagrams of an example mobile computing device with which aspects of the present disclosure may be practiced.
Figure 7B:
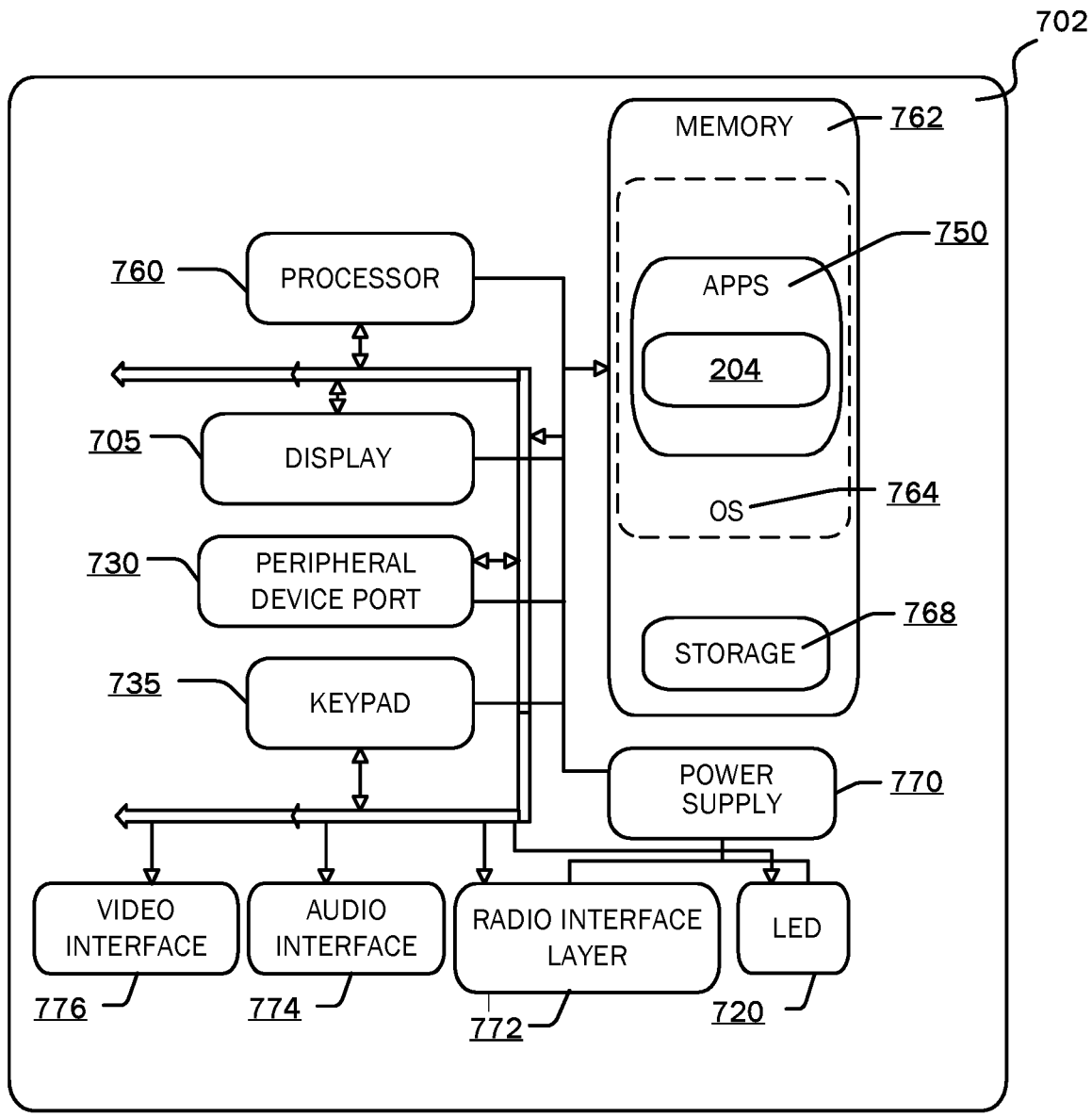

FIGS. 6, 7A, and 7B and the associated descriptions provide a discussion of a variety of operating environments in which examples of the disclosure may be practiced. However, the devices and systems illustrated and discussed with respect to FIGS. 6, 7A, and 7B are for purposes of example and illustration, a vast number of computing device configurations that may be utilized for practicing aspects of the disclosure, described herein.

FIG. 6 is a block diagram illustrating physical components (e.g., hardware) of a computing device 600 with which examples of the present disclosure may be practiced. The computing device components described below may be suitable for one or more of the components of the system 100 described above. In a basic configuration, the computing device 600 includes at least one processing unit 602 and a system memory 604. Depending on the configuration and type of computing device 600, the system memory 604 may comprise volatile storage (e.g., random access memory), non-volatile storage (e.g., read-only memory), flash memory, or any combination of such memories. The system memory 604 may include an operating system 605 and one or more program modules 606 suitable for running software applications 650, such as the core utilization reporting system 204 and other applications.

The operating system 605 may be suitable for controlling the operation of the computing device 600. Furthermore, aspects of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 may perform processes including one or more of the stages of the method 300 illustrated in FIG. 3 and method 500 illustrated in FIG. 5. Other program modules that may be used in accordance with examples of the present disclosure and may include applications such as electronic mail and contacts applications, word processing applications, spreadsheet applications, database applications, slide presentation applications, drawing or computer-aided application programs, etc.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to providing spatial-textual clustering-based predictive recognition of text in a video may be operated via application-specific logic integrated with other components of the computing device 600 on the single integrated circuit (chip). Examples of the present disclosure may also be practiced using other technologies capable of performing logical operations such as, for example, AND, OR, and NOT, including mechanical, optical, fluidic, and quantum technologies.

The computing device 600 may also have one or more input device(s) 612 such as a keyboard, a mouse, a pen, a sound input device, a touch input device, a camera, etc. The output device(s) 614 such as a display, speakers, a printer, etc. may also be included. The aforementioned devices are examples and others may be used. The computing device 600 may include one or more communication connections 616 allowing communications with other computing devices 618. Examples of suitable communication connections 616 include RF transmitter, receiver, and/or transceiver circuitry; universal serial bus (USB), parallel, and/or serial ports.

The term computer readable media as used herein includes volatile and nonvolatile, removable and non-removable media implemented in any method or technology for storage of information, such as computer readable instructions, data structures, or program modules. The system memory 604, the removable storage device 609, and the non-removable storage device 610 are all computer readable media examples (e.g., memory storage.) Computer readable media include random access memory (RAM), read-only memory (ROM), electrically erasable programmable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer readable media may be part of the computing device 600. Computer readable media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

FIGS. 7A and 7B illustrate a mobile computing device 700, for example, a mobile telephone, a smart phone, a tablet personal computer, a laptop computer, and the like, with which aspects of the disclosure may be practiced. With reference to FIG. 7A, an example of a mobile computing device 700 for implementing at least some aspects of the present technology is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative examples, mobile computing device 700 may incorporate more or less input elements. For example, the display 705 may not be a touch screen in some examples. In alternative examples, the mobile computing device 700 is a portable phone system, such as a cellular phone. The mobile computing device 700 may also include an optional keypad 735. Optional keypad 735 may be a physical keypad or a "soft" keypad generated on the touch screen display. In various aspects, the output elements include the display 705 for showing a graphical user interface (GUI), a visual indicator 720 (e.g., a light emitting diode), and/or an audio transducer 725 (e.g., a speaker). In some examples, the mobile computing device 700 incorporates a vibration transducer for providing the user with tactile feedback. In yet another example, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one example of a mobile computing device. That is, the mobile computing device 700 can incorporate a system (e.g., an architecture) 702 to implement some examples. In one example, the system 702 is implemented as a "smart phone" capable of running one or more applications (e.g., videoconference or virtual meeting application, browser, e-mail, calendaring, contact managers, messaging clients, games, and media clients/players). In some examples, the system 702 is integrated as a computing device, such as an integrated personal digital assistant (PDA) and wireless phone.

One or more application programs 750 (e.g., one or more of the components of system 100) may be loaded into the memory 762 and run on or in association with the operating system 764, such as the core utilization reporting system 204. Other examples of the application programs 750 include videoconference or virtual meeting programs, phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 750 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at a remote device or server. As should be appreciated, other applications may be loaded into the memory 762 and run on the mobile computing device 700.

The system 702 has a power supply 770, which may be implemented as one or more batteries. The power supply 770 might further include an external power source, such as an AC adapter or a powered docking cradle that supplements or recharges the batteries.

The system 702 may also include a radio 772 that performs the function of transmitting and receiving radio frequency (RF) communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 750 via the operating system 764, and vice versa.

The visual indicator 720 (e.g., light emitting diode (LED)) may be used to provide visual notifications and/or an audio interface 774 may be used for producing audible notifications via the audio transducer 725. In the illustrated example, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. The system 702 may further include a video interface 776 that enables an operation of a peripheral device port 730 (e.g., an on-board camera) to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio 772 or via a distributed computing network. Similarly, such data/information may be readily transferred between computing devices for storage and use according to well-known data/information transfer and storage means, including electronic mail and collaborative data/information sharing systems.

Examples include a computer-implemented method, comprising: initiating a poll querying a plurality of endpoints of a process on a core of a central processing unit (CPU); recording a timestamp corresponding to initiation of the poll; for each endpoint of the plurality of endpoints that indicates it has work: recording a timestamp corresponding to initiation of processing the work; and recording a timestamp corresponding to completion of processing the work; recording a timestamp corresponding to completion of the poll; determining a total poll time using a first time delta between the timestamp corresponding to initiation of the poll and the timestamp corresponding to completion of the poll; determining a total processing time using a sum of second time deltas between the timestamp corresponding to initiation of processing the work and the timestamp corresponding to completion of processing the work for each endpoint of the plurality of endpoints that indicates it has work; determining a total idle time of the core during the poll by subtracting the sum of second time deltas from the first time delta; and determining actual CPU utilization of the core using the total idle time.

Examples include a system, the system comprising memory storing instructions that, when executed, cause the system to: initiate a poll querying a plurality of endpoints of a process on a core of a central processing unit (CPU); record a timestamp corresponding to initiation of the poll; for each endpoint of the plurality of endpoints that indicates it has work: record a timestamp corresponding to initiation of processing the work; and record a timestamp corresponding to completion of processing the work; record a timestamp corresponding to completion of the poll; determine a total poll time using a first time delta between the timestamp corresponding to initiation of the poll and the timestamp corresponding to completion of the poll; determine a total processing time using a sum of second time deltas between the timestamp corresponding to initiation of processing the work and the timestamp corresponding to completion of processing the work for each of the plurality of endpoints indicating it has work; determine a total idle time of the core by the sum of second time deltas from the first time delta; and determine actual CPU utilization of the core using the total idle time.

Examples include a computer-implemented method, comprising: initiating a poll sequentially querying a plurality of endpoints of a process on a core of a central processing unit (CPU); recording a timestamp corresponding to initiation of the poll; for each endpoint of the plurality of endpoints that indicates it has work: recording a timestamp corresponding to initiation of processing the work; and recording a timestamp corresponding to completion of processing the work; recording a timestamp corresponding to completion of the poll; determining a total poll time using a first time delta between the timestamp corresponding to initiation of the poll and the timestamp corresponding to completion of the poll; determining a total processing time using a sum of second time deltas between the timestamp corresponding to initiation of processing the work and the timestamp corresponding to completion of processing the work for each of the plurality of endpoints indicating it has work; determining a total idle time of the core during the poll by subtracting the sum of second time deltas from the first time delta; determining actual CPU utilization of the core using the total idle time; and reporting metrics associated with the actual CPU utilization of the core.

The methods, modules, and components depicted herein are merely examples. Alternatively, or in addition, the functionality described herein can be performed, at least in part, by one or more hardware logic components. For example, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a system, or any other implementation of a functionality, is described herein as being coupled to another component does not mean that the components are necessarily separate components. As an example, a component A described as being coupled to another component B may be a sub-component of the component B, the component B may be a sub-component of the component A, or components A and B may be a combined sub-component of another component C.

Furthermore, boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A computer-implemented method, comprising:
    initiating a poll querying a plurality of endpoints of a process on a core of a central processing unit (CPU);
    recording a timestamp corresponding to initiation of the poll;
    for each endpoint of the plurality of endpoints that indicates it has work:
        recording a timestamp corresponding to initiation of processing the work; and
        recording a timestamp corresponding to completion of processing the work;
    recording a timestamp corresponding to completion of the poll;
    determining a total poll time using a first time delta between the timestamp corresponding to initiation of the poll and the timestamp corresponding to completion of the poll;
    determining a total processing time using a sum of second time deltas between the timestamp corresponding to initiation of processing the work and the timestamp corresponding to completion of processing the work for each endpoint of the plurality of endpoints that indicates it has work;
    determining a total idle time of the core during the poll by subtracting the sum of second time deltas from the first time delta;
    determining actual CPU utilization of the core using the total idle time;

based on the actual CPU utilization of the core, determining an action that improves utilization of the core, wherein the action comprises at least one of:
    transitioning the process to a lower power core;
    collapsing the process to fewer cores;
    expanding the process to a core on a threshold;
    ceding work to a scheduler; and
    performing queue balancing; and
    causing the action to be performed.

2. The method of claim 1, wherein recording the timestamp corresponding to initiation of processing the work comprises recording a timestamp when a thread of the process is hard-affinitized to the core.

3. The method of claim 1, further comprising determining an idle time rate of the core by determining a ratio between the total idle time and the first time delta.

4. The method of claim 1, wherein determining the actual CPU utilization of the core comprises determining a ratio between the sum of second time deltas and the first time delta.

5. The method of claim 1, further comprising reporting metrics associated with the actual CPU utilization of the core.

6. The method of claim 1, further comprising:
    determining that the actual CPU utilization of the core is not within a utilization threshold.

7. The method of claim 1, where initiating the poll comprises querying the plurality of endpoints in a sequence.

8. A system comprising hardware memory storing instructions that, when executed, cause the system to:
    initiate a poll querying a plurality of endpoints of a process on a core of a central processing unit (CPU);
    record a timestamp corresponding to initiation of the poll;
    for each endpoint of the plurality of endpoints that indicates it has work:
        record a timestamp corresponding to initiation of processing the work; and
        record a timestamp corresponding to completion of processing the work;
    record a timestamp corresponding to completion of the poll;
    determine a total poll time using a first time delta between the timestamp corresponding to initiation of the poll and the timestamp corresponding to completion of the poll;
    determine a total processing time using a sum of second time deltas between the timestamp corresponding to initiation of processing the work and the timestamp corresponding to completion of processing the work for each of the plurality of endpoints indicating it has work;
    determine a total idle time of the core by subtracting the sum of second time deltas from the first time delta;
    determine actual CPU utilization of the core using the total idle time;
    based on the actual CPU utilization of the core, determining an action that improves utilization of the core, wherein the action comprises at least one of:
        transitioning the process to a lower power core;
        collapsing the process to fewer cores;
        expanding the process to a core on a threshold;
        ceding work to a scheduler; and
        performing queue balancing; and
    causing the action to be performed.

9. The system of claim 8, wherein the timestamp corresponding to initiation of processing the work comprises a timestamp corresponding to when a thread of the process is hard-affinitized to the core.

10. The system of claim 8, wherein the instructions further cause the system to determine an idle time rate of the core by determining a ratio between the total idle time and the first time delta.

11. The system of claim 8, wherein in determining the actual CPU utilization of the core, the instructions cause the system to determine a ratio between the sum of the second time deltas and the first time delta.

12. The system of claim 8, wherein the instructions further cause the system to report metrics associated with the actual CPU utilization of the core.

13. The system of claim 12, wherein the instructions further cause the system to determine the actual CPU utilization of the core is not within a utilization threshold.

14. The system of claim 8, where the poll is performed in a loop.

15. A computer-implemented method, comprising:
    initiating a poll sequentially querying a plurality of endpoints of a process on a core of a central processing unit (CPU);
    recording a timestamp corresponding to initiation of the poll;
    for each endpoint of the plurality of endpoints that indicates it has work:
        recording a timestamp corresponding to initiation of processing the work; and
        recording a timestamp corresponding to completion of processing the work;
    recording a timestamp corresponding to completion of the poll;
    determining a total poll time using a first time delta between the timestamp corresponding to initiation of the poll and the timestamp corresponding to completion of the poll;
    determining a total processing time using a sum of second time deltas between the timestamp corresponding to initiation of processing the work and the timestamp corresponding to completion of processing the work for each of the plurality of endpoints indicating it has work;
    determining a total idle time of the core during the poll by subtracting the sum of second time deltas from the first time delta;
    determining actual CPU utilization of the core using the total idle time;
    based on the actual CPU utilization of the core, determining an action that improves utilization of the core, wherein the action comprises at least one of:
        transitioning the process to a lower power core;
        collapsing the process to fewer cores;
        expanding the process to a core on a threshold;
        ceding work to a scheduler; and
        performing queue balancing; and
    causing the action to be performed.

16. The computer-implemented method of claim 15, wherein recording the timestamp corresponding to initiation of processing the work comprises recording a timestamp when a thread of the process is hard-affinitized to the core.

17. The computer-implemented method of claim 15, further comprising:
    determining an idle time rate of the core by determining a ratio between the total idle time and the first time delta; and wherein determining the actual CPU utilization of the core by determining a ratio between the sum of the second time deltas and the first time delta.

18. The computer-implemented method of claim 15, further comprising:

determining that the actual CPU utilization of the core is not a utilization threshold.

19. The computer-implemented method of claim 15, further comprising reporting metrics associated with the actual CPU utilization of the core.

20. The computer-implemented method of claim 15, initiating the poll comprises querying the plurality of endpoints in a sequence.

* * * * *